(12) United States Patent
Larsen

(10) Patent No.: US 9,391,306 B2
(45) Date of Patent: Jul. 12, 2016

(54) END-LOADED BATTERY CARRIAGE

(75) Inventor: Glen C. Larsen, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 744 days.

(21) Appl. No.: 12/475,120

(22) Filed: May 29, 2009

(65) Prior Publication Data

US 2010/0304188 A1    Dec. 2, 2010

(51) Int. Cl.
*H01M 2/10* (2006.01)
*H01M 2/34* (2006.01)

(52) U.S. Cl.
CPC .............. *H01M 2/105* (2013.01); *H01M 2/342* (2013.01); *H01M 2/1055* (2013.01); *H01M 2/34* (2013.01)

(58) Field of Classification Search
CPC ....................................................... H01M 2/105
USPC .............................................................. 429/1
See application file for complete search history.

(56) References Cited

U.S. PATENT DOCUMENTS

| | | | |
|---|---|---|---|
| 4,272,591 A | 6/1981 | Brander | |
| 4,595,641 A | 6/1986 | Giurtino | |
| 4,969,206 A | 11/1990 | Desrochers | |
| 5,206,098 A * | 4/1993 | Cho | H01M 2/1055 429/100 |
| 5,217,395 A | 6/1993 | Bailey et al. | |
| 5,229,220 A | 7/1993 | Stanton et al. | |
| 5,378,549 A | 1/1995 | Eylon | |
| 5,431,575 A * | 7/1995 | Engira | H01M 2/1055 429/100 |
| 5,623,550 A | 4/1997 | Killion | |
| 6,274,266 B1 * | 8/2001 | Wang | H01M 2/1055 320/107 |

(Continued)

FOREIGN PATENT DOCUMENTS

JP    48019923 U    3/1973
JP    48071326 U    9/1973

(Continued)

OTHER PUBLICATIONS

"International Search Report", Mailed Date: Dec. 6, 2010, Application No. PCT/US2010/036212, Filed Date: May 26, 2010, pp. 8.

(Continued)

*Primary Examiner* — Ula C Ruddock
*Assistant Examiner* — Archer Dudley
(74) *Attorney, Agent, or Firm* — Qudua Olaniran; Judy Yee; Micky Minhas

(57) ABSTRACT

A battery carriage is provided, including first and second dual-contact assemblies. The first dual contact assembly is disposed on a body portion of the battery carriage and the second dual contact assembly is disposed on a separable portion of the battery carriage. Each dual contact assembly includes a positive contact configured to contact a positive terminal of a battery and a negative contact configured to contact a negative terminal of the battery. The separable portion of the battery carriage is selectively moveable into and out of a coupled state with the body portion. When the separable portion is moved into the coupled state, the dual contact assemblies are held spaced apart to define a receptacle in which the dual contact assemblies hold opposing ends of the battery. Movement of the separable portion into the coupled state also establishes electrical conductivity between the positive contacts of each of the dual contact assemblies, and between the negative contacts of each of the dual contact assemblies.

17 Claims, 6 Drawing Sheets

(56) References Cited

U.S. PATENT DOCUMENTS

| | | | |
|---|---|---|---|
| 6,737,190 B2 * | 5/2004 | Chaya | H04N 5/232 206/316.2 |
| 6,783,390 B2 | 8/2004 | Berg et al. | |
| 7,625,667 B2 * | 12/2009 | Marty | E03C 1/055 137/613 |
| 7,897,276 B2 * | 3/2011 | Campesi | H01M 2/1055 429/100 |
| 2006/0201558 A1 | 9/2006 | Marty et al. | |
| 2007/0275299 A1 * | 11/2007 | Larsen | H01M 2/1022 429/100 |
| 2008/0268296 A1 | 10/2008 | Larsen | |
| 2009/0130493 A1 | 5/2009 | Larsen | |

FOREIGN PATENT DOCUMENTS

| | | |
|---|---|---|
| JP | 56154766 U | 11/1981 |
| JP | 57130956 U | 8/1982 |
| JP | 58019461 U | 2/1983 |
| JP | 63149065 U | 9/1988 |
| JP | 2006032292 A | 2/2006 |
| JP | 2010525548 A | 7/2010 |
| KR | 2019990007204 U | 2/1999 |
| RU | 2159484 C1 | 11/2000 |
| RU | 2160195 C2 | 12/2000 |
| TW | M293535 U | 7/2006 |
| TW | M304779 U | 1/2007 |
| TW | M314435 U | 6/2007 |
| TW | M314436 U | 6/2007 |
| TW | M318197 U | 9/2007 |
| WO | 2008134137 A1 | 11/2008 |

OTHER PUBLICATIONS

"Reverse Battery Protection Using PPTC Devices", Retrieved at<<http://www.globalspec.com/reference/5937/Reverse-Battery-Protection-Using-PPTC-Devices>>, pp. 3.

Japan Patent Office, Office Action for Japanese Patent Application No. 2012-513216, Apr. 1, 2014, 8 pages.

ISA European Patent Office, Search Report of EP10781138, Nov. 15, 2012, Germany, 4 pages.

State Intellectual Property Office of People's Republic China, Search Report of Chinese Patent Application No. 201080023710.6, Oct. 10, 2012, China, 4 pages.

Japan Patent Office, Notice of Allowance issued in Japanese Patent Application No. 2012513216, Jul. 25, 2014, 4 Pages.

Taiwan Intellectual Property Office, Office Action and Search Report issued in Taiwan Patent Application No. 99113356, Jun. 10, 2014, 10 Pages.

"Notice of Allowance Issued in Australian Patent Application No. 2010254083", Mailed Date: Feb. 14, 2014, Filed Date: May 26, 2010, 2 Pages.

"Notice of Allowance Issued in Russian Patent Application No. 2011148345", Mailed Date: Apr. 22, 2014, Filed Date: May 26, 2010, 14 Pages.

Australian Patent Office, Office Action of Australian Patent Application No. 2010254083, Dec. 18, 2013, 3 pages.

* cited by examiner

END-LOADED BATTERY CARRIAGE

BACKGROUND

Batteries are commonly used to provide power to electronic devices. Typically, batteries are placed within a battery-operated device in a particular orientation to properly complete an electrical circuit. For example, some batteries have a positive terminal at one end of the battery and a negative terminal at the other end of the battery, and the battery must be properly oriented within the device so that the battery terminals engage appropriate contacts of the device. Incorrectly orienting batteries within a device may not only yield an incomplete circuit rendering the battery-operated device unusable, but may also cause permanent damage to the electronic components of the device.

SUMMARY

Accordingly, the present description provides a battery carriage which may be incorporated into a battery-operated device. The battery carriage includes first and second dual-contact assemblies, each of which has a positive contact configured to contact a positive terminal of a battery and a negative contact configured to contact a negative terminal of the battery. The positive and negative contacts of the dual-contact assemblies ensure proper electrical connection of the battery to the battery carriage and battery-operated device regardless of how the battery is placed in the battery carriage. The battery carriage further includes a body portion to which the first dual-contact assembly is affixed and a separable portion to which the second dual-contact assembly is affixed. The separable portion is selectively moveable into and out of a coupled state with the body portion. In the coupled state, the first dual-contact assembly and the second dual-contact assembly are held in a spaced relationship to define a receptacle in which the first dual-contact assembly and the second dual-contact assembly are operable to receive and hold opposing ends of the battery. Movement of the separable portion into the coupled state establishes electrical conductivity between the respective positive contacts of the dual-contact assemblies and the respective negative contacts of the dual-contact assemblies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is related to a battery carriage configured to receive end-loaded batteries. Unlike certain side-loading implementations, the presently described end-loaded battery carriages have part of the battery carriage affixed to a separable portion of the device, such as a battery door of the device. Furthermore, coupling the separable portion in place may hold the battery in a described position and/or establish appropriate electrical connections. For example, the device may have a battery chamber into which the batteries are end-loaded, such that when a hinged or detachable door is placed on the device the electrical connection of the batteries with the rest of the electronic circuit is completed. Devices that utilize such a battery carriage may include flashlights, wireless computer mice, digital cameras, gaming controllers, remote controls, and the like.

In previous solutions, battery chambers required a user to insert a battery in a particular orientation, taking care to properly align positive and negative terminals with corresponding polarity-specific contacts (i.e., positive and negative) on the device. Although such previous solutions are typically accompanied by a diagram or instructions indicating the proper battery orientation, it may be difficult to see such instructions under conditions where eyesight is compromised, such as poorly lit areas, or as may be the case for some elderly users. Additionally, such instructions may be difficult for young children to follow. Furthermore, following such diagrams each time batteries are replaced in a device that quickly goes through batteries may be unnecessarily time-consuming and such battery replacement may become frustrating to the user. As described above, incorrectly orienting batteries in such previous solutions not only renders the electrical circuit incomplete, but may also damage other electronic components of the device. Thus, the battery carriage of the present disclosure includes dual-contact assemblies configured to accept batteries of either orientation, as described in more detail hereafter.

Figure 2:
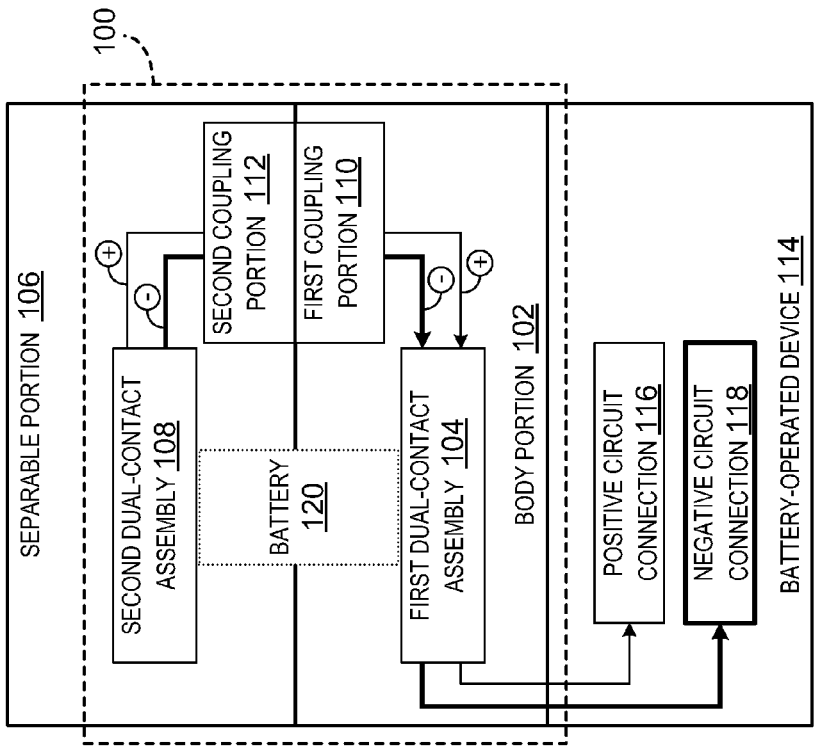
FIG. 2 shows a block diagram of the battery carriage of FIG. 1 in a coupled state.
Figure 1:
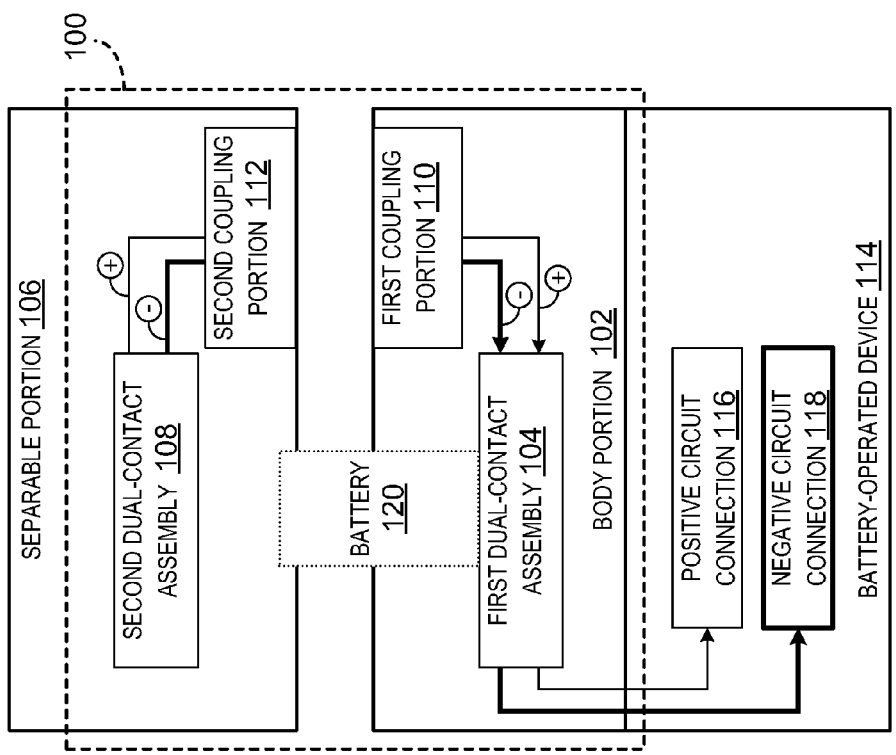
FIG. 1 shows a block diagram of an embodiment of a battery carriage in an uncoupled state.

FIGS. 1 and 2 show an embodiment of a battery carriage 100, comprising a body portion 102 to which a first dual-contact assembly 104 may be affixed, and a separable portion 106 to which a second dual-contact assembly 108 may be affixed. FIG. 1 shows an uncoupled state of battery carriage 100, while FIG. 2 shows a coupled state of battery carriage 100. More particularly, separable portion 106 may be selectively moveable into and out of a coupled state with body portion 102. Moving separable portion 106 into the coupled state establishes electrical conductivity between first dual-contact assembly 104 and second dual-contact assembly 108. In some embodiments, an electrical coupler may be used for establishing the electrical conductivity. Such a coupler may include a first coupling portion 110 and a second coupling portion 112, described later in more detail.

Returning to FIG. 1, body portion 102 may be disposed on a battery-operated device 114. Nonlimiting examples of such a battery-operated device 114 include a flashlight, a wireless computer mouse, a digital camera, a gaming controller, a remote control, etc. In some examples, separable portion 106 may be a battery chamber door of battery-operated device 114. Such a separable portion 106 (e.g., a battery chamber door of the battery-operated device) may be fully detachable from the body portion 102 of the battery-operated device 114. Alternatively, separable portion 106 may be moveably connected to the body portion 102 of the battery-operated device 114. Nonlimiting examples of such moveable connections include hinges, snaps, guides and the like.

First dual-contact assembly 104 includes a positive contact configured to contact a positive terminal of a battery and a negative contact configured to contact a negative terminal of the battery. Likewise, second dual-contact assembly 108 includes a positive contact configured to contact the positive terminal of the battery and a negative contact configured to contact the negative terminal of the battery. Accordingly, a battery having a positive terminal and a negative terminal at opposing ends of the battery could then be positioned between first dual-contact assembly 104 and second dual-contact assembly 108 in either of the two possible orientations. In other words, the battery could be positioned in a first orientation with the positive terminal of the battery contacting the positive contact of first dual-contact assembly 104 and the negative terminal of the battery contacting the negative contact of second dual-contact assembly 108 (positive battery terminal pointed downward in FIG. 1). Alternatively, the battery may instead be positioned in another orientation with a negative terminal of the battery contacting the negative contact of first dual-contact assembly 104 and the positive terminal of the battery contacting the positive contact of second dual-contact assembly 108 (positive battery terminal pointed upward in FIG. 1). Thus, battery carriage 100 may be configured to receive a battery in either orientation and still maintain/create appropriate electrical connections to the device.

Figure 3:
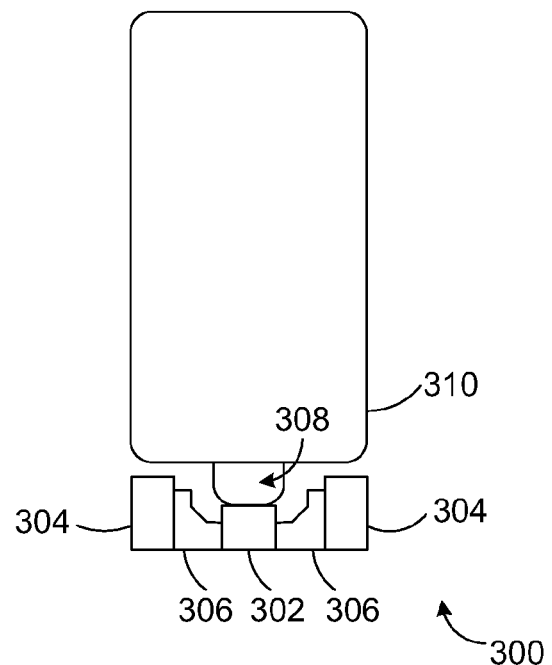
FIG. 3 schematically shows an embodiment of a dual-contact assembly in contact with a positive terminal of a battery.
Figure 4:
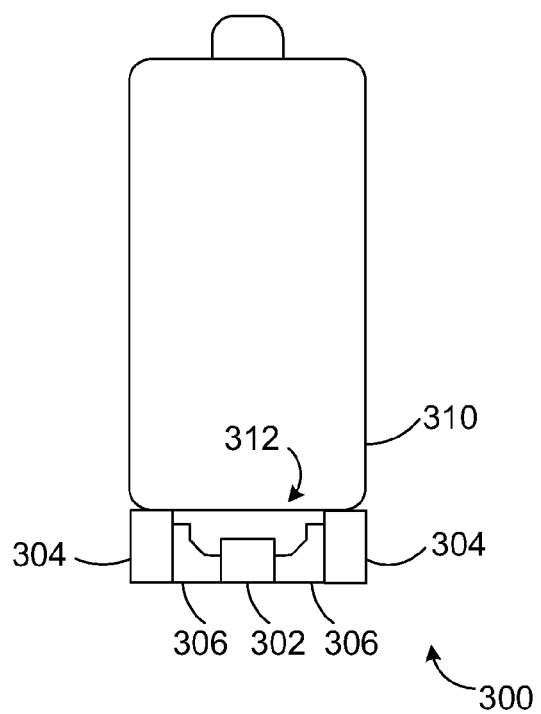
FIG. 4 schematically shows the dual-contact assembly of FIG. 3 in contact with a negative terminal of the battery.

As an example, FIG. 3 illustrates an embodiment of such a dual-contact assembly, namely dual-contact assembly 300 including a positive contact 302 and a negative contact 304. Dual-contact assembly 300 further includes electrical insulator 306 to prevent electrical conductivity between positive contact 302 and negative contact 304. As depicted, positive contact 302 is recessed and configured to contact a protruding positive terminal 308 of battery 310. FIG. 4 illustrates an alternative orientation of battery 310 with respect to dual-contact assembly 300. As depicted, negative contact 304 is not recessed, and is configured to contact a substantially flat negative terminal 312 of battery 310. Accordingly, proper terminal contact is established regardless of how the battery is oriented.

Returning to FIGS. 1 and 2, first dual-contact assembly 104 is electrically coupled to a positive circuit connection 116 of the battery-operated device 114 and electrically coupled to a negative circuit connection 118 of the battery-operated device 114. More specifically, the positive contact of first dual-contact assembly 104 is electrically coupled to the positive circuit connection 116, and the negative contact of first dual-contact assembly 104 is electrically coupled to the negative circuit connection 118. Accordingly, a battery placed into battery carriage 100 may then be used to power battery-operated device 114.

As described above, FIG. 1 illustrates separable portion 106 not being in a coupled state with body portion 102. Alternatively, FIG. 2 illustrates separable portion 106 being in a coupled state with body portion 102. In the coupled state, first dual-contact assembly 104 and second dual-contact assembly 108 are held in a spaced relationship to define a receptacle in which first dual-contact assembly 104 and second dual-contact assembly 108 are operable to receive and hold opposing ends of a battery 120.

Further, as described above, by moving separable portion 106 into the coupled state with body portion 102, electrical conductivity is established between first dual-contact assembly 104 and second dual-contact assembly 108. More specifically, the coupled state establishes electrical conductivity between the positive contact of first dual-contact assembly 104 and the positive contact of second dual-contact assembly 108 and also establishes electrical conductivity between the negative contact of first dual-contact assembly 104 and the negative contact of second dual-contact assembly 108. Alternatively, coupling and decoupling the two portions may only cause connection and interruption of the positive connections between the dual-contact assemblies (or the negative connections).

As described above, in some embodiments, an electrical coupler may be used for establishing the electrical conductivity. Such a coupler may include a first coupling portion 110 and a second coupling portion 112. First coupling portion 110 includes a positive contact electrically coupled to the positive contact of first dual-contact assembly 104, and a negative contact electrically coupled to the negative contact of first dual-contact assembly 104. Likewise, second coupling portion 112 includes a positive contact electrically coupled to the positive contact of second dual-contact assembly 108, and a negative contact electrically coupled to the negative contact of second dual-contact assembly 108. Accordingly, in the coupled state, the positive contact of first coupling portion 110 is electrically coupled to the positive contact of second coupling portion 112, and the negative contact of first coupling portion 110 is electrically coupled to the negative contact of second coupling portion 112.

First coupling portion 110 and second coupling portion 112 may include any suitable electrical coupler components. For example, in some embodiments, second coupling portion 112 may include a positive contact and a negative contact as described above. First coupling portion 110 may then include a spring-loaded connector pin (e.g., a pogo pin) configured to electrically couple to the positive contact of second coupling portion 112 when the spring-loaded connector pin physically contacts the positive contact of second coupling portion 112. Accordingly, first coupling portion 110 may further include another spring-loaded connector pin configured to electrically couple to the negative contact of second coupling portion 112 when the spring-loaded connector pin physically contacts the negative contact of second coupling portion 112. Utilizing such an electrical coupler allows the separable portion 106 to partially or fully detach from body portion 102 in the uncoupled state, and then establish electrical conductivity when in the coupled state.

In some embodiments, battery carriage 100 may be configured to receive more than one end-loaded battery. In such embodiments, first dual-contact assembly 104 and second dual-contact assembly 108 define a dual-contact assembly pair for receiving a first battery, and the battery carriage 100 may then further comprise one or more additional dual-contact assembly pairs for receiving one or more additional batteries. Such embodiments are described in more detail with reference to FIGS. 8 and 9.

Figure 5:
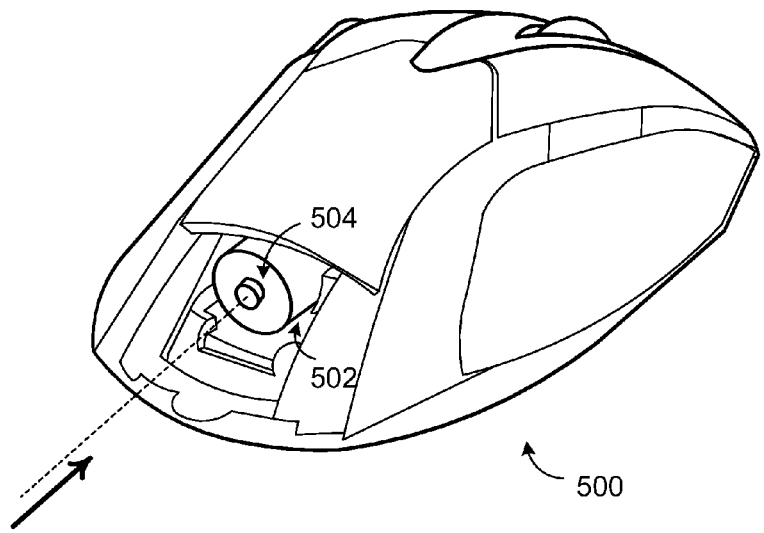
FIG. 5 schematically shows an embodiment of a battery-operated device permitting end-loading of a battery.

FIG. 5 schematically shows an embodiment of a battery-operated device 500. As depicted, battery-operated device 500 is a wireless computer mouse, wherein a battery chamber door (not shown in FIG. 5) has been removed to illustrate a battery chamber 502 (e.g., a battery carriage). Battery chamber 502 may be configured to receive a battery 504 via an end-loading operation in which the battery is longitudinally inserted into the device.

Figure 6:
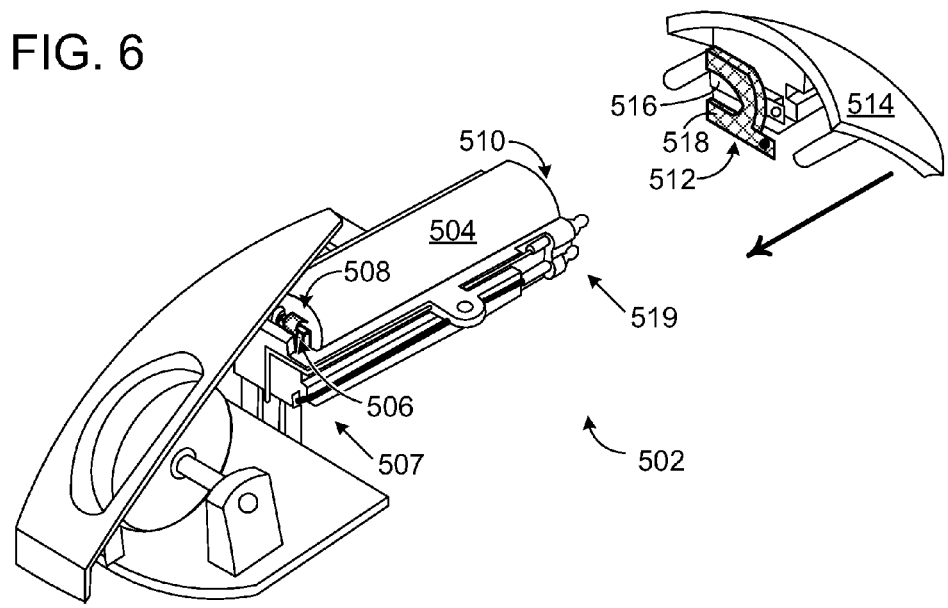
FIG. 6 is a partially-sectioned exploded view of the device of FIG. 5, which shows a battery chamber door of the device in an uncoupled state.

FIG. 6 schematically shows another view of battery chamber 502 of battery-operated device 500. In the view of FIG. 6, battery-operated device 500 has been rotated 180 degrees with respect to FIG. 5, and an outside casing has been removed in order to view the components of battery chamber 502. As depicted, battery chamber 502 is defined within a housing which is configured to permit end-loading of battery 504 into battery chamber 502.

Battery-operated device 500 further includes a first dual-contact assembly 506 disposed at a first opposing end 507 of the housing. As described above, the first dual-contact assembly 506 includes a positive contact configured to contact a positive terminal of battery 504 and a negative contact configured to contact a negative terminal of battery 504. As depicted in FIGS. 5 and 6, battery 504 is oriented such that the negative terminal 508 of battery 504 is contacting first dual-contact assembly 506. However, it is to be understood that battery 504 could instead be in the reverse orientation, with the positive terminal 510 of battery 504 contacting the first dual-contact assembly 506.

Battery-operated device 500 further includes a second dual-contact assembly 512 disposed on a battery chamber door 514. Second dual-contact assembly 512 further includes a positive contact 516 configured to contact the positive terminal of battery 504, and a negative contact 518 configured to contact the negative terminal of battery 504. As described above, FIGS. 5 and 6 show battery 504 oriented such that the positive terminal 510 of battery 504 will contact the positive contact 516 of second dual-contact assembly 512 when in the coupled state. However, it is to be understood that battery 504 could instead be in the reverse orientation, with the negative terminal 508 of battery 504 contacting the negative contact 518 of second dual-contact assembly 512.

Battery chamber door 514 is selectively moveable into and out of a coupled state with a second opposing end 519 of the housing. As depicted in FIG. 6, battery chamber door 514 is not in a coupled state.

Figure 7:
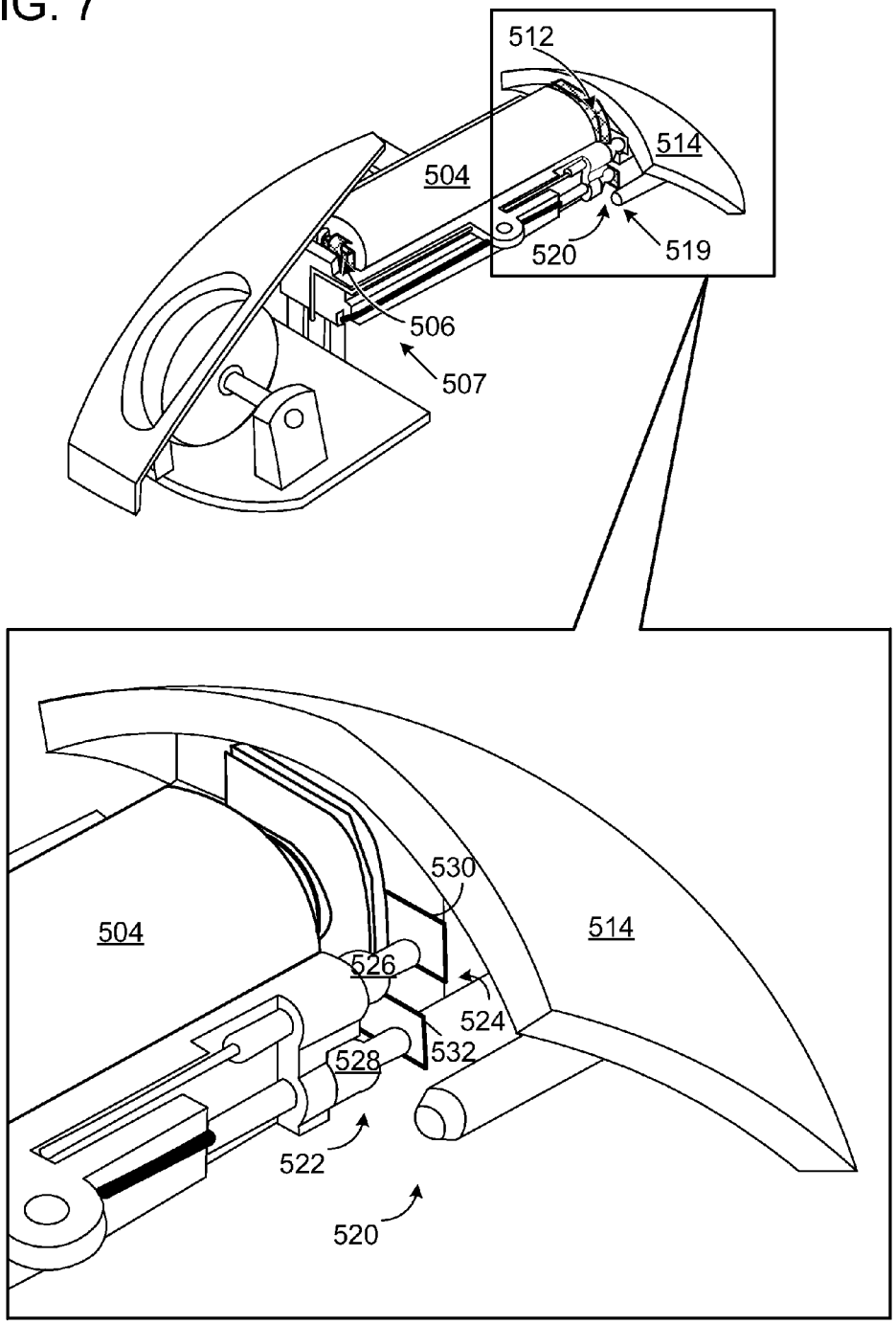
FIG. 7 is a view similar to FIG. 6, but showing the battery chamber door in a coupled state.

As an example, FIG. 7 depicts battery chamber door 514 in a coupled state with second opposing end 519 of the housing. In the coupled state, first dual-contact assembly 506 and second dual-contact assembly 512 are held in a spaced relationship to receive and hold opposing ends of battery 504. Furthermore, moving battery chamber door 514 into the coupled state establishes electrical conductivity between the positive contact of the first dual-contact assembly 506 and the positive contact 516 of the second dual-contact assembly 512. Moving battery chamber door 514 into the coupled state further establishes electrical conductivity between the negative contact of first dual-contact assembly 506 and the negative contact 518 of the second dual-contact assembly 512.

Further, the electrical conductivity may be established by an electrical coupler 520. Electrical coupler 520 may include a first coupling portion 522 electrically coupled to the first dual-contact assembly 506 and a second coupling portion 524 electrically coupled to the second dual-contact assembly 512. As an example, first coupling portion 522 may include a spring-loaded connector pin 526 electrically coupled to a positive contact of first dual-contact assembly 506, and a spring-loaded connector pin 528 electrically coupled to a negative contact of first dual-contact assembly 506. Second coupling portion 524 may include a positive contact 530 electrically coupled to a positive contact 516 of second dual-contact assembly 512, and a negative contact 532 electrically coupled to a negative contact 518 of second dual-contact assembly 512. Thus, in a coupled state, spring-loaded connector pin 526 contacts positive contact 530, and spring-loaded connector pin 528 contacts negative contact 532.

As described above, a battery chamber may be configured to receive more than one battery. In such a case, the battery chamber includes one or more dual-contact assembly pairs, where each pair includes a first dual-contact assembly and a second dual-contact assembly and where each dual-contact assembly pair is configured to receive a battery in either of the two potential orientations.

Figure 8:
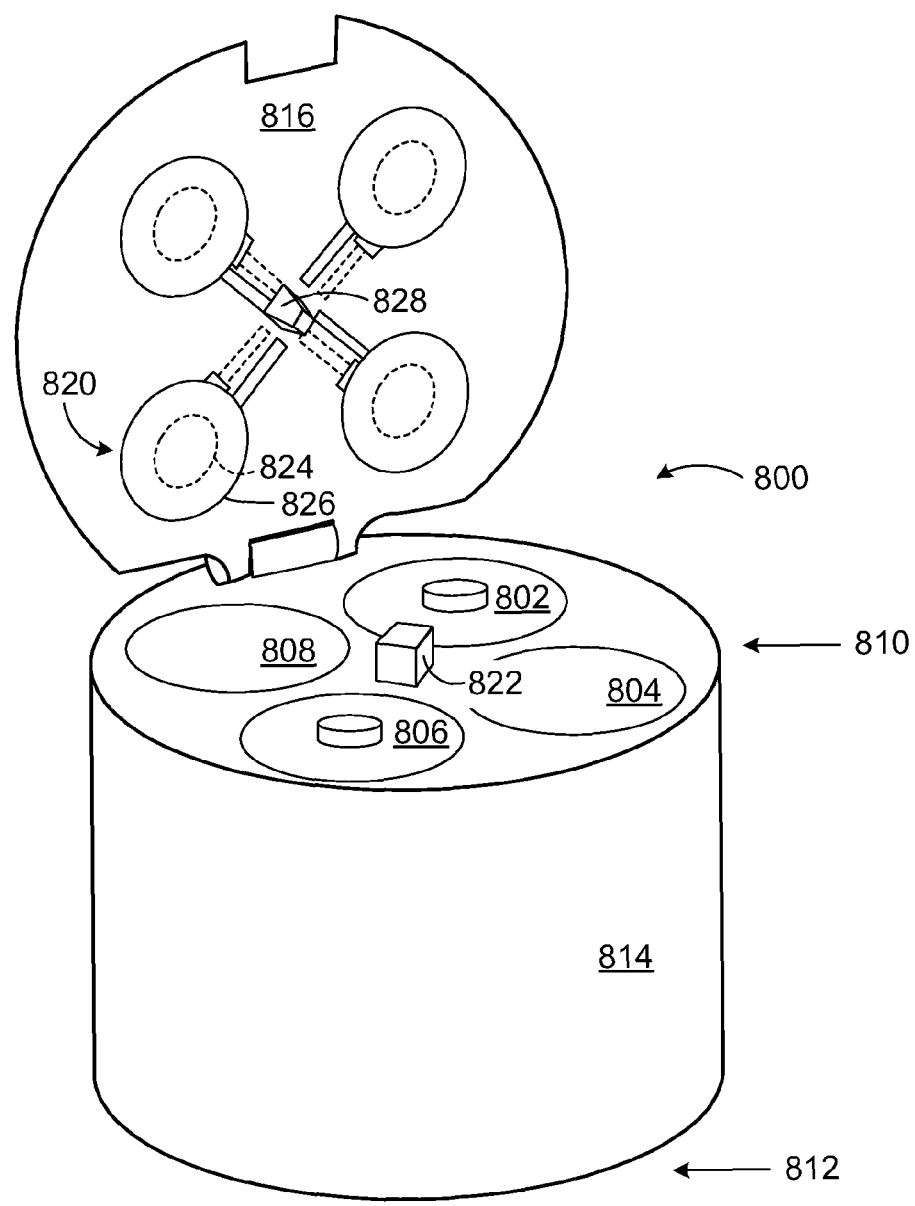
FIG. 8 schematically shows another embodiment of a battery chamber.

FIG. 8 shows an example of a battery chamber 800 configured to receive four end-loaded batteries, namely battery 802, battery 804, battery 806 and battery 808. However, it is to be understood that this is just one example of such a battery chamber, and that battery chambers configured to receive a plurality of batteries as discussed herein could be configured to receive the batteries in other configurations without departing from the scope of this disclosure.

As described above, in previous solutions, battery chambers were configured to receive each battery in a particular orientation. However, as described above with reference to battery carriage 100 and battery chamber 502, battery chamber 800 may also receive each battery in either orientation, i.e., with a positive terminal at opposing end 810 of battery chamber 800, or with a negative terminal at opposing end 810. As depicted, battery 802 and battery 806 are of the former orientation (positive battery terminals pointing upward), and battery 804 and battery 808 are of the latter orientation (positive battery terminals pointing downward). However, this is just shown for example purposes, in that each battery may be oriented in either orientation as the dual-contact assembly receiving each battery is configured to receive a battery in either orientation as described above.

A first dual-contact assembly (not shown) of each of the four dual-contact assembly pairs is located at an opposing end 812 of battery chamber 800 disposed within a device 814. Accordingly, a second dual-contact assembly of each of the four dual-contact assembly pairs is located at a battery chamber door 816 of device 814. As an example, second dual-contact assembly 820 is shown for the dual-contact assembly pair configured to receive battery 808.

Each first dual-contact assembly includes a positive contact configured to contact a positive terminal of a battery, and a negative contact configured to contact a negative terminal of a battery. Each of these positive contacts is electrically connected to a positive circuit connection at device 814, and each of these negative contacts is electrically connected to a negative circuit connection at device 814. Furthermore, each first dual-contact assembly is electrically connected to a first coupling portion 822.

Each second dual-contact assembly includes a positive contact configured to contact a positive terminal of a battery, and a negative contact configured to contact a negative terminal of a battery. As an example, second dual-contact assembly 820 includes a positive contact 824 and a negative contact 826. Each second dual-contact assembly is electrically connected to a second coupling portion 828. When battery chamber door 816 is in a coupled state with respect to the body portion of device 814, a first dual-contact of each dual-contact assembly pair becomes electrically connected to the second dual-contact of that dual-contact assembly pair, via contact of the first coupling portion 822 with second coupling portion 828. In some embodiments, a dual-contact assembly, such as a first dual-contact assembly or a second dual-contact assembly, may include a spring feature to ensure continuous interface with the battery. Further, in some embodiments, a dual-contact assembly may include a separator wall between the positive contact and the negative contact to prevent the battery from touching both contacts at the same time.

In multi-battery configurations such as that depicted in FIG. 8, the dual-contact assembly pairs may be electrically coupled in various ways. In some examples, the dual-contact assembly pairs may be wired together so as to produce a series connection for the batteries. In other examples, the dual-contact assembly pairs may be wired to produce a parallel architecture. In either case, wiring connections may be established if desired through use of a printed circuit board or like mechanism at the opposing end 812 of battery chamber 800. In the case of a parallel architecture, it may be possible to achieve some simplification of wiring connections. For example, all of the positive terminals of the dual-contact assemblies on battery chamber door 816 could be wired together, and all of the negative terminals could be wired together. As a result, this parallel circuit architecture may be created by having only one positive wire and one negative wire coupled through interaction of first coupling portion 822 and second coupling portion 828. Alternatively, for a series circuit configuration, N positive coupling wires and N negative coupling wires may be needed for a configuration of N batteries. Furthermore, the above-mentioned examples of parallel circuit wiring and series circuit wiring are nonlimiting in that other wiring configurations may also be created, such as circuit architectures having a combination of series and parallel circuits.

Figure 9:
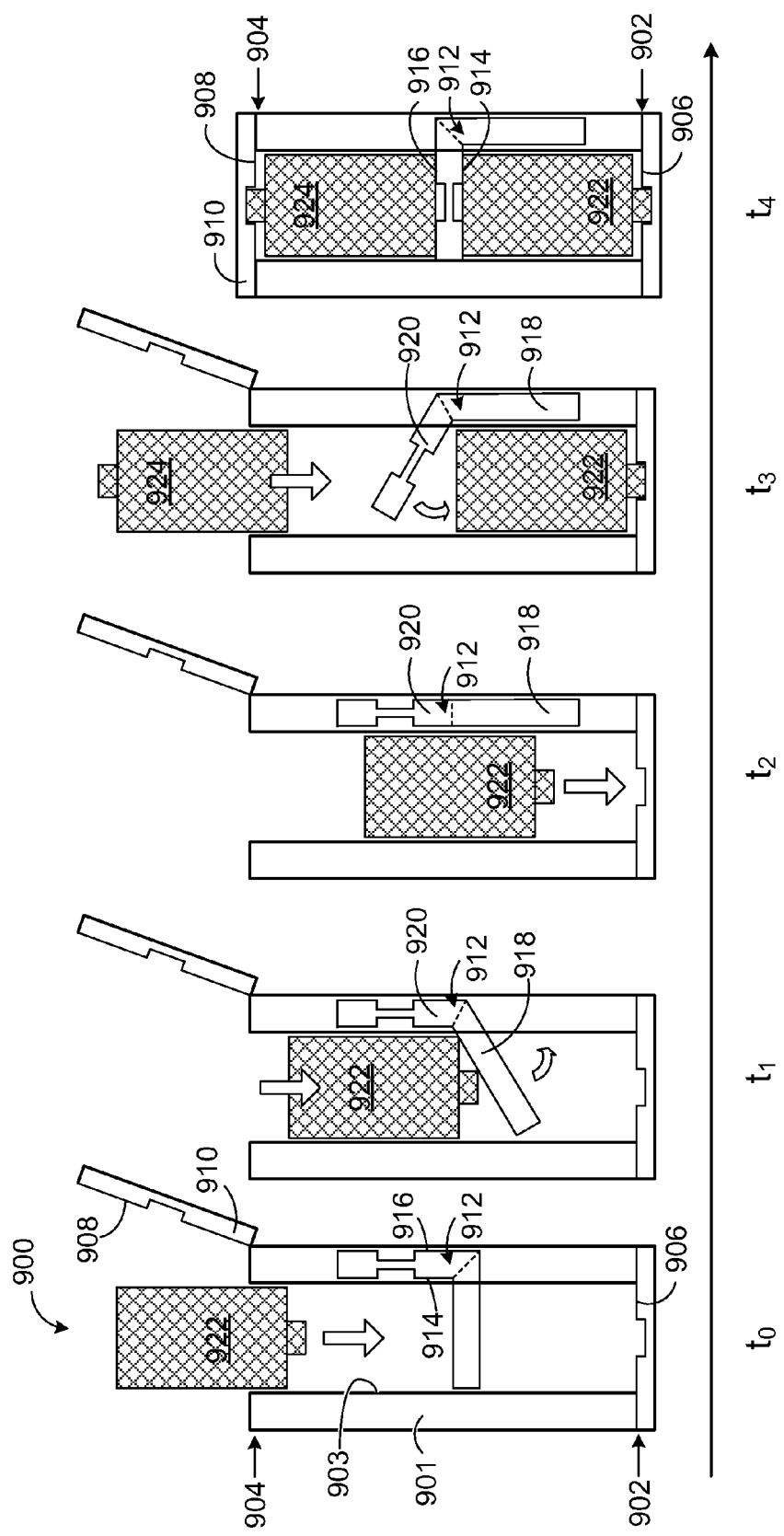
FIG. 9 schematically shows yet another embodiment of a battery chamber.

FIG. 9 illustrates another battery carriage configures to receive a plurality of batteries, namely battery carriage 900. Battery carriage 900 includes a battery chamber defined within a housing configured to permit longitudinal insertion of a plurality of batteries, such that, when installed into the battery chamber, the plurality of batteries define an end-to-end stack. The figure shows a time sequence $t_0$, $t_1$, etc. through $t_4$, in which two batteries (i.e., battery 922 and battery 924) are successively inserted into battery carriage 900, with the result being a two-battery stack installed into the battery carriage. Two batteries are shown for simplicity of illustration and description, though it should be appreciated that such a carriage may be constructed to accommodate a stack having three or more batteries.

As shown at time $t_0$, a first battery 922 of the stack is inserted into a proximal end 904 of a housing 901 which defines the battery chamber 903. Housing 901 also includes a distal end 902 which contacts a distal end of the battery stack once it is fully installed into the housing, as shown at time $t_4$. Battery carriage 900 further includes a dual-contact assembly 906 at the distal end 902 of the housing, and a dual-contact assembly 908 disposed on a battery chamber door 910 which is affixable to the proximal end 904 of the housing. In some embodiments, the housing may be disposed within a battery-operated device. In such a case, dual-contact assembly 906 and/or dual contact assembly 908 may be electrically coupled to a positive circuit connection at the battery-operated device and electrically coupled to a negative circuit connection at the battery-operated device so that the end-to-end stack of batteries in battery carriage 900 may provide power to the battery-operated device.

Battery carriage 900 further includes a spacer assembly 912 disposed within the housing for each adjacent pair of the plurality of batteries. Spacer assembly 912 separates that adjacent pair of the plurality of batteries and has a dual-contact assembly 914 for a first battery of that adjacent pair and a dual-contact assembly 916 for a second battery of that adjacent pair. The dual-contact assemblies at the proximal and distal ends of the housing, and on spacer assembly 912, are all similar to dual-contact assemblies of the previously-described examples. In particular, they are designed with positive and negative battery terminal contacts which make appropriate electrical contact with a battery regardless of which battery terminal (positive or negative) they are engaged with.

In the depicted example, battery carriage 900 is configured to receive two batteries and therefore includes one spacer assembly 912 between this adjacent pair of batteries. However, in other embodiments, a battery carriage may receive, for example, three batteries. In such a three-battery stack, the battery carriage would have two spacer assemblies. One would separate a first adjacent pair of batteries and the other would separate the second adjacent pair of batteries. More generally, a battery carriage may be configured to receive n batteries to form an end-to-end stack of n batteries. Accordingly, such a stack includes (n-1) adjacent battery pairs, and therefore the battery carriage includes (n-1) spacer assemblies disposed within the housing.

The spacer assembly may be movable between a first state, in which the spacer separates adjacent batteries in an installed end-to-end stack, and a second state, in which batteries may pass longitudinally through the battery chamber housing past the spacer assembly. More particularly, as shown in FIG. 9, spacer assembly 912 may include two portions that are spring-loaded. In some embodiments, the two portions may be spring-loaded relative to each other. In other embodiments, the two portions may be spring-loaded relative to the housing. Still further, the two portions may be spring-loaded relative to each other and to the housing. As such, the spacer assembly 912 may flex to permit passage of an end-loaded battery, as successively depicted at times $t_1$, $t_2$ and $t_3$ in the figure. Spacer assembly 912 may include a first portion 918 spring-loaded or otherwise elastically-deformable relative to a second portion 920, and the two portions 918 and 920 may further be spring-loaded or otherwise elastically-deformable relative to the housing. Accordingly, in response to contact with battery 922, first portion 918 flexes with respect to 920 to allow passage of battery 922, as most clearly seen at time $t_2$. Furthermore, once battery 922 has passed spacer assembly 912, second portion 920 flexes back as shown at time $t_3$, thus returning to the unstretched configuration with respect to first portion 918.

The dual-contact assemblies and the one or more spacer assemblies of the FIG. 9 example are configured so that each of the plurality of batteries in the end-to-end stack is held in an orientation-neutral battery-length receptacle defined by a pair of the dual-contact assemblies. As shown at time $t_4$, a first dual-contact assembly pair including dual-contact assembly 906 and dual-contact assembly 914 of spacer assembly 912 form a first orientation-neutral battery-length receptacle so as to receive battery 922. Accordingly, battery 922 may be oriented as depicted with a positive terminal contacting dual-contact assembly 906 and a negative terminal contacting dual-contact assembly 914, or may instead be oriented in the reverse orientation.

As further shown at time $t_4$, another dual-contact assembly pair including dual-contact assembly 908 and dual-contact assembly 916 of spacer assembly 912 form another orientation-neutral battery-length receptacle so as to receive another battery, namely battery 924. Accordingly, battery 924 may be oriented as depicted with a positive terminal contacting dual-contact assembly 908 and a negative terminal contacting dual-contact assembly 916, or may instead be oriented in the reverse orientation.

The orientation-neutral battery-length receptacles are electrically coupled together to produce a desired electrical architecture for the end-to-end stack regardless of how each of the plurality of batteries is inserted into the housing. For example, in some embodiments, the dual-contact assemblies may be electrically connected such that the orientation-neutral battery-length receptacles are electrically coupled together to produce a series circuit. For example, for a given receptacle in a stack with an adjacent receptacle above and an adjacent receptacle below, the positive connection of the middle receptacle would be wired to the negative connection of the adjacent receptacle above, and the negative connection would be wired to the positive connection of the adjacent receptacle below.

In another example, the dual-contact assemblies may be electrically connected such that the orientation-neutral battery-length receptacles are electrically coupled together to produce a parallel circuit. In contrast to the series example, the parallel architecture would be achieved by bringing the positive connections of the battery-length receptacles to a common node/location, and the negative connections to another common node/location. In yet another example, the dual-contact assemblies may be electrically connected such that the orientation-neutral battery-length receptacles are electrically coupled together to produce a combination of parallel circuits and series circuits. For example, two batteries within the stack might be in a series configuration, but wired in parallel with another two batteries that are in a series configuration. The dual-contact assemblies, and their deployment in pairs to define orientation-neutral receptacles, enable a desired electrical architecture to be achieved for the batteries and the battery stack, regardless of how a user inserts the individual batteries.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery carriage comprising:
   a first dual-contact assembly including a first positive contact configured to contact a positive terminal of a battery when the battery is installed in a first orientation and a first negative contact configured to contact a negative terminal of the battery when the battery is installed in a second orientation;
   a second dual-contact assembly including a second positive contact configured to contact the positive terminal of the battery when the battery is installed in the second orientation and a second negative contact configured to contact the negative terminal of the battery when the battery is installed in the first orientation;
   a body portion to which the first dual-contact assembly is affixed, the body portion including a first coupling portion including a third positive contact electrically coupled to the first positive contact and a third negative contact electrically coupled to the first negative contact; and
   a separable portion to which the second dual-contact assembly is affixed, the separable portion including a second coupling portion including a fourth positive contact electrically coupled to the second positive contact and a fourth negative contact electrically coupled to the second negative contact;
   where the separable portion is selectively moveable into and out of a coupled state with the body portion, such that, responsive to the separable portion and the body portion moving into the coupled state, the third positive contact physically contacts with and electrically couples to the fourth positive contact and the third negative contact physically contacts with and electrically couples to the fourth negative contact, thereby electrically coupling the first positive contact to the second positive contact and electrically coupling the first negative contact to the second negative contact; and
   where, in the coupled state, the first dual-contact assembly and the second dual-contact assembly are held in a spaced relationship to define a receptacle in which the first dual-contact assembly and the second dual-contact assembly are operable to hold opposing ends of the battery in either the first orientation or the second orientation.

2. The battery carriage of claim 1, where the body portion is disposed on a battery-operated device.

3. The battery carriage of claim 2, where the separable portion is a battery chamber door of the battery-operated device.

4. The battery carriage of claim 3, where the battery chamber door of the battery-operated device is fully detachable from the body portion.

5. The battery carriage of claim 3, where the battery chamber door of the battery-operated device is moveably connected to the body portion.

6. The battery carriage of claim 2, where the first positive contact of the first dual-contact assembly is electrically coupled to a positive circuit connection of the battery-operated device and the first negative contact of the first dual-contact assembly is electrically coupled to a negative circuit connection of the battery-operated device.

7. The battery carriage of claim 1, where the first dual-contact assembly and the second dual-contact assembly define a dual-contact assembly pair for receiving a first battery, the battery carriage further comprising one or more additional dual-contact assembly pairs for receiving one or more additional batteries.

8. A battery-operated device comprising:
   a battery chamber defined within a housing which is configured to permit end-loading of a battery into the battery chamber;
   a first dual-contact assembly disposed at a first opposing end of the housing and including a first positive contact configured to contact a positive terminal of the battery and a first negative contact configured to contact a negative terminal of the battery; and
   a second dual-contact assembly disposed on a battery chamber door and including a second positive contact configured to contact the positive terminal of the battery and a second negative contact configured to contact the negative terminal of the battery;
   a first coupling portion affixed to the battery chamber and including a first spring-loaded connector pin electrically coupled to the first positive contact and a second spring-loaded connector pin electrically coupled to the first negative contact;
   a second coupling portion affixed to the battery chamber door and including a first pin receiver electrically coupled to the second positive contact and a second pin receiver electrically coupled to the second negative contact;

where the battery chamber door is selectively moveable into and out of a coupled state with a second opposing end of the housing;

where, in the coupled state, the first dual-contact assembly and the second dual-contact assembly are held in a spaced relationship to receive and hold opposing ends of the battery; and where moving the battery chamber door into the coupled state establishes physical contact and electrical conductivity between the first spring-loaded connector pin and the first pin receiver, thereby establishing electrical conductivity between the first positive contact of the first dual-contact assembly and the second positive contact of the second dual-contact assembly and establishes physical contact and electrical conductivity between the second spring-loaded connector pin and the second pin receiver, thereby establishing electrical conductivity between the first negative contact of the first dual-contact assembly and the second negative contact of the second dual-contact assembly.

9. The battery-operated device of claim 8, where the first dual-contact assembly is electrically coupled to a positive circuit connection at the battery-operated device and electrically coupled to a negative circuit connection at the battery-operated device.

10. The battery-operated device of claim 8, where the first dual-contact assembly and the second dual-contact assembly define a dual-contact assembly pair for receiving a first battery, the battery-operated device further comprising one or more additional dual-contact assembly pairs for receiving one or more additional batteries that are end-loaded into the battery chamber.

11. A battery carriage comprising:

a first dual-contact assembly affixed to a body portion and including a first positive contact and a first negative contact;

a second dual-contact assembly affixed to a separable portion that is selectively moveable into and out of a coupled state with the body portion, the second dual-contact assembly including a second positive contact and a second negative contact;

a first coupling portion affixed to the body portion and including a third positive contact electrically coupled to the first positive contact and a third negative contact electrically coupled to the first negative contact; and a second coupling portion affixed to the separable portion and including a fourth positive contact electrically coupled to the second positive contact and a fourth negative contact electrically coupled to the second negative contact such that, responsive to the separable portion and the body portion moving into the coupled state, the third positive contact physically contacts with and electrically couples to the fourth positive contact and the third negative contact physically contacts with and electrically couples to the fourth negative contact, thereby electrically coupling the first positive contact to the second positive contact and electrically coupling the first negative contact to the second negative contact.

12. The battery carriage of claim 1, where the third positive contact includes a spring-loaded connector pin.

13. The battery carriage of claim 1, where the third negative contact includes a spring-loaded connector pin.

14. The battery-operated device of claim 8, where the battery chamber is a constituent element of a wireless computer mouse.

15. The battery-operated device of claim 8, where the battery chamber is a constituent element of a digital camera.

16. The battery-operated device of claim 8, where the battery chamber is a constituent element of a gaming controller.

17. The battery-operated device of claim 8, where the battery chamber is a constituent element of a remote control.

* * * * *